Patented Jan. 13, 1931

1,788,680

UNITED STATES PATENT OFFICE

KARL LÜDECKE, OF BERLIN-DAHLEM, GERMANY

PROCESS FOR THE PRODUCTION OF TRIMETHYLAMINEGLYCOL MONOBORATE

No Drawing. Application filed March 29, 1928, Serial No. 265,815, and in Germany July 8, 1927.

German Patent Specification No. 290,740 describes the production of a beta hydroxy-ethyl trimethyl ammonium triborate by allowing at least 3 molecules of boric acid to act upon 1 molecule of beta hydroxy-ethyl trimethyl ammonium hydroxide, the structural formula of which latter is

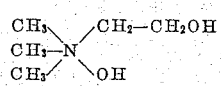

Hitherto it has only been possible to prepare the beta hydroxyl-ethyl trimethyl ammonium monoborate in aqueous solution, by the addition of a molecule of boric acid to 1 molecule of the base. If the aqueous solution is concentrated, the salt decomposes, and it is impossible to crystallize the salt from the viscous syrup which remains behind.

It is possible in a surprising manner however to cause the solidification of the syrup, which is formed in concentrating a solution, if the concentration is effected in a vacuum, for example at about 30–60° C. or if use is made as initial material of a solution which contains more than 1 molecule, but less than 3 molecules boric acid to 1 molecule beta hydroxy-ethyl trimethyl ammonium glycol. In the latter process it is even possible to obtain a practically quantitative yield of beta hydroxy-ethyl trimethyl ammonium monoborate, if 2 molecules boric acid are dissolved to 1 molecule of the base. If a solution prepared with 1 or more than 1 but less than 3 molecules boric acid is concentrated by evaporation according to the foregoing particulars, a viscous syrup is left behind, which solidifies in the cold forming a vitreous mass, without crystallizing. This syrup is readily soluble in alcohol, but is insoluble in ether, acetone, benzene, acetic ester. If the syrup is treated with solvents, in which it is insoluble, as for instance with acetone, it solidifies after some time into crystals of beta hydroxy-ethyl trimethyl ammonium monoborate. The syrup can also be dissolved first of all in alcohol and then the alcoholic solution treated with solvents in which the syrup is insoluble; an oily, syrupy substance is deposited, which solidifies after a little while and also consists of beta hydroxy-ethyl trimethyl ammonium monoborate; it is also possible to use as initial material an alcoholic solution of beta hydroxy-ethyl trimethyl ammonium hydroxide and to treat this with the necessary amount of boric acid and then precipitate the monoborate with solvents in which it is insoluble.

It is surprising that from a solution which contains more than 1 molecule boric acid, preferably about 2 molecules boric acid to 1 molecule of hydroxide it is possible to obtain the pure monoborate, and not a mixture of monoborate with diborate.

Beta hydroxy-ethyl trimethyl ammonium monoborate is a white, micro-crystalline salt, which crystallizes with 1 molecule of water; its structural formula is

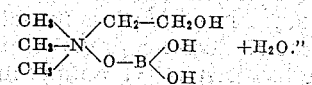

It reacts alkaline to litmus and melts at above 300°. It dissolves readily in water and in alcohols. From the hot concentrated alcoholic solution it precipitates first in an oily state when cooling. It is insoluble in ether, acetic ester, acetone, benzene and toluene. It can be precipitated from the alcoholic solution by these solvents. The salt is intended for therapeutic purposes.

Example I 9 gs. boric acid are dissolved in an aqueous solution of 18 gs. beta hydroxy-ethyl trimethyl ammonium hydroxide and the solution is concentrated by evaporation in a vacuum at about 30°–60°. The oily residue is dissolved in alcohol and the solution, which is filtered if desired, is treated with acetone. An oil is again precipitated, and becomes solid after standing for a time. The solid body is filtered off, a washing with acetone carried out and drying in a vacuum at 50°. The white salt is beta hydroxy-ethyl trimethyl ammonium monoborate with 1 molecule water.

Example II

An aqueous solution of 24 gs. beta hydroxy-ethyl trimethyl ammonium hydroxide is treated with 24 gs. boric acid and boiled down on a water-bath to a syrup. The remaining syrup is dissolved in 150 ccm. alcohol, filtered if desired and precipitated with 300 ccm. acetone. The precipitated oil soon solidifies. It is then filtered off, washed with acetone and the white precipitate dried. It consists of pure beta hydroxy-ethyl trimethyl ammonium monoborate with 1 molecule water (calculated: 7.64% N; found 7.57% N).

*Example III*

An alcoholic solution of 9 gs. beta hydroxy-ethyl trimethyl ammonium hydroxide is treated with 5 gs. boric acid. After the boric acid is dissolved, acetone is added to this solution in a quantity such that turbidity no longer occurs upon a further addition. The deposited precipitate which is at first oily soon solidifies. It is filtered off, washed with acetone and ether and dried in a vacuum.

What I claim is:

1. A process for the preparation of beta hydroxy-ethyl trimethyl ammonium monoborate from beta hydroxy-ethyl trimethyl ammonium hydroxide and boric acid, consisting in dissolving in an aqueous solution of beta hydroxy-ethyl trimethyl ammonium hydroxide at least one but less than three molecules of boric acid to each molecule of the hydroxide, concentrating this solution in vacuo and precipitating the beta hydroxy-ethyl trimethyl ammonium monoborate with organic liquids in which it is insoluble.

2. A process for the preparation of beta hydroxy-ethyl trimethyl ammonium monoborate from beta hydroxy-ethyl trimethyl ammonium hydroxide and boric acid, consisting in dissolving in an aqueous solution of beta hydroxyethyl trimethylammonium hydroxide at least one but less than three molecules of boric acid to each molecule of the hydroxide, concentrating this solution in vacuo, re-dissolving the concentrate in alcohol and precipitating the beta hydroxy-ethyl trimethyl ammonium monoborate from the solution by organic liquids in which it is insoluble.

3. A process for the preparation of beta hydroxy-ethyl trimethyl ammonium monoborate from beta-hydroxy-ethyl trimethyl ammonium hydroxide and boric acid, consisting in dissolving in an aqueous solution of beta hydroxy-ethyl trimethyl ammonium hydroxide at least one but less than three molecules of boric acid to each molecule of the hydroxide, concentrating this solution in vacuo, redissolving the concentrate in alcohol and precipitating the beta hydroxy-ethyl trimethyl ammonium monoborate from the solution by acetone.

4. A process for the preparation of beta hydroxy-ethyl trimethyl ammonium monoborate from beta hydroxy-ethyl trimethyl ammonium hydroxide and boric acid, consisting in dissolving in an alcoholic solution of beta hydroxy-ethyl trimethyl ammonium hydroxide at least one but less than three molecules of boric acid to each molecule of the hydroxide, and precipitating the beta hydroxy-ethyl trimethylammonium monoborate with organic liquids in which it is insoluble.

In testimony whereof I hereunto affix my signature.

KARL LÜDECKE.